US012592403B2

(12) United States Patent
Ahn et al.

(10) Patent No.: US 12,592,403 B2
(45) Date of Patent: Mar. 31, 2026

(54) HUMIDIFIER SYSTEM FOR FUEL CELL

(71) Applicant: KOLON INDUSTRIES, INC., Seoul (KR)

(72) Inventors: Woong Jeon Ahn, Seoul (KR); Kyoung Ju Kim, Seoul (KR); Hyoung Mo Yang, Seoul (KR); Do Woo Kim, Seoul (KR); Jung Kun Her, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 378 days.

(21) Appl. No.: 18/253,614

(22) PCT Filed: Nov. 9, 2021

(86) PCT No.: PCT/KR2021/016194
§ 371 (c)(1),
(2) Date: May 19, 2023

(87) PCT Pub. No.: WO2022/139169
PCT Pub. Date: Jun. 30, 2022

(65) Prior Publication Data
US 2023/0420706 A1 Dec. 28, 2023

(30) Foreign Application Priority Data

Dec. 23, 2020 (KR) ........................ 10-2020-0182638
Nov. 5, 2021 (KR) ........................ 10-2021-0151715

(51) Int. Cl.
*H01M 8/04* (2016.01)
*B01D 63/02* (2006.01)
*H01M 8/04119* (2016.01)

(52) U.S. Cl.
CPC ...... *H01M 8/04149* (2013.01); *B01D 63/031* (2022.08)

(58) Field of Classification Search
CPC ......... H01M 8/04149; H01M 8/04126; H01M 8/04141; H01M 2008/1095;
(Continued)

(56) References Cited

U.S. PATENT DOCUMENTS 4,239,729 A * 12/1980 Hasegawa .......... B01D 63/0233
422/48
5,002,590 A * 3/1991 Friesen ................ B01D 53/268
95/52
(Continued)

FOREIGN PATENT DOCUMENTS

CN 110767923 A * 2/2020 ........ H01M 8/04126
JP 2002303435 A 10/2002
(Continued)

OTHER PUBLICATIONS

Epo translation of KR20140038223 (Year: 2014).*
Epo translation of KR102446774 (Year: 2019).*
EP Extended European Search Report dated Sep. 3, 2024.

*Primary Examiner* — Stephen Hobson
(74) *Attorney, Agent, or Firm* — Harvest IP Law, LLP

(57) ABSTRACT

The present disclosure provides a fuel cell humidifying system for supplying humidified air to the fuel cell, and
The fuel cell humidifying system according to an embodiment of the present disclosure
includes: a plurality of humidifying modules configured to humidify battery gas to be supplied to a fuel cell stack by using wet gas; a humidifier configured to supply wet gas to the humidifying modules and discharge the wet gas discharged from the humidifying modules; a supply cap coupled to one side of the wet part to supply the battery gas to the humidifying modules; and a discharge cap coupled to the other side of the wet part to discharge the battery gas discharged from the humidifying modules to the fuel cell stack, (Continued)

and each of the humidifying modules comprises a cartridge coupled to a plurality of hollow fiber membranes, a mid-case coupled to one or more cartridges, a supply hole formed through the mid-case so that wet gas is supplied into the mid-case, and a discharge hole formed through the mid-case so that the wet gas is discharged the mid-case, and the wet part comprises a wet body for accommodating the humidifying modules therein, a supply member for supplying the wet gas to the wet body, and a discharge member for discharging the wet gas from the wet body.

6 Claims, 9 Drawing Sheets

(58) Field of Classification Search
CPC .......... H01M 2250/20; H01M 8/04119; B01D 63/031; B01D 2313/02; B01D 2313/08; B01D 2313/10; B01D 2313/12; B01D 2313/13; B01D 2313/23; B01D 2313/26; B01D 2319/04; B01D 63/043; Y02E 60/50
See application file for complete search history.

(56) References Cited

U.S. PATENT DOCUMENTS

| | | | | |
|---|---|---|---|---|
| 5,264,171 | A * | 11/1993 | Prasad | B01D 63/101 264/254 |
| 5,996,976 | A * | 12/1999 | Murphy | B01J 8/009 261/107 |
| 6,077,436 | A * | 6/2000 | Rajnik | B01D 63/066 210/321.82 |
| 9,859,576 | B2 * | 1/2018 | Koo | H01M 8/04149 |
| 11,646,431 | B2 * | 5/2023 | Kim | H01M 8/04104 261/105 |
| 2002/0162785 | A1 * | 11/2002 | Futselaar | B01D 63/033 210/321.89 |
| 2004/0076874 | A1 * | 4/2004 | Nickel | B01D 63/062 429/104 |
| 2005/0110172 | A1 * | 5/2005 | Tanaka | B01D 63/02 261/104 |
| 2005/0235615 | A1 * | 10/2005 | Nyman | B01D 53/0431 55/350.1 |
| 2008/0085437 | A1 * | 4/2008 | Dean | H01M 8/04014 429/514 |
| 2010/0028740 | A1 * | 2/2010 | Kume | H01M 8/04149 429/413 |
| 2011/0127683 | A1 * | 6/2011 | Kim | H01M 8/04141 261/DIG. 65 |
| 2011/0143232 | A1 * | 6/2011 | Burban | B01D 61/00 96/10 |
| 2012/0111967 | A1 * | 5/2012 | Katagiri | B01D 63/033 239/34 |
| 2012/0189925 | A1 * | 7/2012 | Matsusue | H01M 8/04753 429/444 |
| 2012/0231357 | A1 * | 9/2012 | Kim | A61M 16/145 429/414 |
| 2012/0270120 | A1 * | 10/2012 | Kim | H01M 8/04156 429/413 |
| 2012/0282533 | A1 * | 11/2012 | Kim | B01D 63/02 429/413 |

| | | | | |
|---|---|---|---|---|
| 2013/0065140 | A1 * | 3/2013 | Kim | B01D 63/04 429/413 |
| 2013/0137005 | A1 * | 5/2013 | Kim | H01M 8/04141 429/414 |
| 2014/0011110 | A1 * | 1/2014 | Oku | H01M 8/0271 429/456 |
| 2014/0077402 | A1 * | 3/2014 | Brandt | H01M 8/04149 261/100 |
| 2014/0234743 | A1 * | 8/2014 | Sasamoto | H01M 8/2485 429/456 |
| 2015/0188162 | A1 * | 7/2015 | Lee | B01D 69/08 261/100 |
| 2015/0364779 | A1 * | 12/2015 | Noh | H01M 8/04149 429/413 |
| 2016/0036073 | A1 * | 2/2016 | Kim | H01M 8/04291 429/414 |
| 2016/0036075 | A1 * | 2/2016 | Kim | H01M 8/04492 |
| 2016/0079616 | A1 * | 3/2016 | Lee | B01D 53/22 210/321.88 |
| 2016/0322654 | A1 * | 11/2016 | Koo | B01D 63/0222 |
| 2017/0077530 | A1 * | 3/2017 | Kim | H01M 8/04141 |
| 2017/0077531 | A1 * | 3/2017 | Kim | B01F 23/20 |
| 2017/0100701 | A1 * | 4/2017 | Kim | B01D 63/043 |
| 2017/0149074 | A1 * | 5/2017 | Kim | H01M 8/04126 |
| 2017/0301932 | A1 * | 10/2017 | Bauer | B01D 63/0231 |
| 2017/0358808 | A1 * | 12/2017 | Kim | H01M 8/04149 |
| 2018/0316028 | A1 * | 11/2018 | An | H01M 8/04805 |
| 2019/0015787 | A1 * | 1/2019 | Oh | H01M 8/04 |
| 2019/0326618 | A1 * | 10/2019 | Oh | H01M 8/04149 |
| 2020/0052312 | A1 * | 2/2020 | Kim | H01M 8/04149 |
| 2020/0153004 | A1 * | 5/2020 | Oh | H01M 8/04149 |
| 2020/0330927 | A1 * | 10/2020 | An | H01M 8/1058 |
| 2022/0013797 | A1 * | 1/2022 | Oh | B01D 63/04 |
| 2022/0013798 | A1 * | 1/2022 | Oh | H01M 8/04149 |
| 2022/0344684 | A1 * | 10/2022 | Ahn | H01M 8/0438 |
| 2024/0285824 | A1 * | 8/2024 | Bernthal | A61L 2/22 |
| 2025/0187435 | A1 * | 6/2025 | Song | B60K 35/22 |

FOREIGN PATENT DOCUMENTS

| | | | | |
|---|---|---|---|---|
| JP | 2010127582 | A | 6/2010 | |
| JP | 2018199098 | A | 12/2018 | |
| KR | 20090013304 | A | 2/2009 | |
| KR | 20090057773 | A | 6/2009 | |
| KR | 20090128005 | A | 12/2009 | |
| KR | 20100108092 | A | 10/2010 | |
| KR | 20100131631 | A | 12/2010 | |
| KR | 20110001022 | A | 1/2011 | |
| KR | 20110006122 | A | 1/2011 | |
| KR | 20110006128 | A | 1/2011 | |
| KR | 20110021217 | A | 3/2011 | |
| KR | 20110026696 | A | 3/2011 | |
| KR | 20140038223 | * | 3/2014 | |
| KR | 20140038223 | A * | 3/2014 | F24F 3/14 |
| KR | 101459907 | B1 | 11/2014 | |
| KR | 20160150414 | A | 12/2016 | |
| KR | 20190035257 | * | 4/2019 | |
| KR | 102446774 | * | 5/2019 | |
| KR | 20190081736 | A | 7/2019 | |
| KR | 102006140 | B1 | 8/2019 | |
| KR | 20200107874 | A | 9/2020 | |
| KR | 20210067366 | A | 6/2021 | |
| KR | 20210067367 | A | 6/2021 | |
| WO | WO-2019098642 | A2 * | 5/2019 | H01M 8/04149 |
| WO | 2019-235800 | A1 | 12/2019 | |
| WO | WO-2019240481 | A1 * | 12/2019 | B01D 63/0233 |
| WO | 2021-107679 | A1 | 6/2021 | |

* cited by examiner

HUMIDIFIER SYSTEM FOR FUEL CELL

CROSS REFERENCE TO RELATED APPLICATION(S)

This application is a National Stage of International Application No. PCT/KR2021/016194 filed Nov. 9, 2021, claiming priority to Korean Patent Application No. 10-2020-0182638 filed Dec. 23, 2020 and Korean Patent Application No. 10-2021-0151715 filed Nov. 5, 2021, the disclosures of which are incorporated herein by reference in its entirety.

TECHNICAL FIELD

The present disclosure relates to a fuel cell humidifying system for supplying humidified air to a fuel cell.

BACKGROUND ART

A fuel cell is a power-generating cell that produces electricity by combining hydrogen and oxygen. A fuel cell can continuously produce electricity as long as hydrogen and oxygen are supplied, unlike conventional chemical batteries such as dry cells and storage batteries, and has the advantage of being about twice as efficient as internal combustion engines because there is no heat loss.

In addition, because chemical energy generated by a combination of hydrogen and oxygen is directly converted into electrical energy, fuel cells emit less pollutants. Therefore, fuel cells are not only environmentally friendly characteristics, but also reducing concerns about resource depletion due to increasing energy consumption."

Depending on the type of electrolyte used, these fuel cells may be classified largely into Polymer Electrolyte Membrane Fuel Cell (PEMFC), Phosphoric Acid Fuel Cell (PAFC), and Molten Carbonate Fuel Cell (MCFC), solid oxide fuel cell (SOFC), and alkaline fuel cell (AFC).

Although each of these fuel cells operates on the same fundamental principle, they differ in the type of fuel used, operating temperature, catalyst, electrolyte, and other factors. Among them, Polymer Electrolyte Membrane Fuel Cell (PEMFC) is known to be the most promising fuel cell not only in small-scale stationary power generation equipment, but also in transportation systems, due to its operation at low temperatures compared to other fuel cells and high power density, which allows for miniaturization.

One of the most important factors in improving the performance of Polymer Electrolyte Membrane Fuel Cells (PEMFC) is to maintain function efficiency by supplying a certain amount of moisture to the Polymer Electrolyte Membrane (PEM) or Proton Exchange Membrane in the Membrane Electrode Assembly (MEA)." This is because when the polymer electrolyte membrane is dried, power generation efficiency is rapidly reduced.

There are several methods to humidify a Polymer Electrolyte Membrane, including 1) a bubbler humidification method for supplying moisture by passing a target gas through a diffuser after filling a pressure vessel with water, 2) a direct injection method for supplying moisture directly to a gas passage through a solenoid valve by calculating a required moisture supply for fuel cell reaction, and 3) a membrane humidifying method for supplying moisture to a gas fluid layer using a polymer separation membrane.

Among these methods, a membrane humidifying method for humidifying a polymer electrolyte membrane by supplying water vapor to air to be supplied to the polymer electrolyte membrane by use of a membrane which selectively allows only water vapor included in off-gas to pass therethrough is advantageous in that the membrane humidifier can be lightweight and miniaturized.

The selective permeable membrane used in the membrane humidifying method is preferably a hollow fiber membrane having a large permeable area per unit volume when a module is formed. In other words, when a membrane humidifier is manufactured using a hollow fiber membrane, high integration of hollow fiber membrane with large contact surface area is possible, so it is possible to sufficiently humidify a fuel cell even with a small capacity, to use low-cost materials, and to recover moisture and heat contained in off-gas discharged at a high temperature from the fuel cell and thus reuse the recovered moisture and heat through the membrane humidifier.

FIG. 1 is a schematic exploded perspective view of a conventional fuel cell humidifier.

As illustrated in FIG. 1, a conventional membrane-humidification-type humidifier 100 includes a humidifying module 110 in which moisture is exchanged between air supplied from an outside and exhaust gas discharged from a fuel cell stack (not shown), and caps 12 coupled to both ends of the humidifying module 110.

One of the caps 120 transfers air supplied from the outside to the humidifying module 110, and the other one transfers the air humidified by the humidifying module 110 to the fuel cell stack.

The humidifying module 110 includes a mid-case 111 having an off-gas inlet 111a and an off-gas outlet 111b, and a plurality of hollow fiber membranes 112 in the mid-case 111. Both ends of a bundle of hollow fiber membranes 112 are potted on a fixing layer 113. The fixing layer 113 is generally formed by curing a liquid polymer such as liquid polyurethane resin through a casting method. The fixing layer 113, in which the ends of the hollow fiber membranes 112 are potted, and the resin layer 114 between the fixing layer 113 and the mid-case 111 block the internal spaces of the caps 120 from the internal space of the mid-case 111. Similarly to the fixing layer 113, the resin layer 114 is generally formed by curing a liquid polymer such as liquid polyurethane resin through a casting method.

Air supplied from the outside flows along hollows of the hollow fiber membranes 112.

The off-gas introduced into the mid-case 111 through the off-gas inlet 111a comes into contact with outer surfaces of the hollow fiber membranes 112 and is then discharged from the mid-case 111 through the off-gas outlet 111b. When the off-gas contacts the outer surface of the hollow fiber membranes 112, moisture contained in the off-gas permeates the hollow fiber membranes 112, thereby humidifying the air flowing along the hollows of the hollow fiber membranes 112.

Recently, the development of technologies to increase the power generation of fuel cell systems, such as increasing the number of fuel cell stacks, is actively underway. "In order to increase the power generation of the fuel cell system, a flow rate of air humidified in a humidification process needs to be increased. In order to increase the flow rate of humidified air, a method of installing a plurality of the humidifiers 100 has been proposed. However, since this method requires a considerable installation area for the off-gas inlet 111a, the off-gas outlet 111b, and the caps 120 protruding from the mid-case 111 of each humidifier 100, which increases construction and operational costs."

DISCLOSURE

Technical Problem

The present disclosure has been made to solve the above problems, and is to provide a fuel cell humidifying system capable of reducing an installation area while increasing a flow rate of air humidified through a humidification process.

Technical Solution

A fuel cell humidifying system according to an embodiment of the present disclosure includes: a plurality of humidifying modules configured to humidify battery gas to be supplied to a fuel cell stack by using wet gas; a humidifier configured to supply wet gas to the humidifying modules and discharge the wet gas discharged from the humidifying modules; a supply cap coupled to one side of the wet part to supply the battery gas to the humidifying modules; and a discharge cap coupled to the other side of the wet part to discharge the battery gas discharged from the humidifying modules to the fuel cell stack. Each of the humidifying modules includes a cartridge coupled to a plurality of hollow fiber membranes, a mid-case coupled to one or more cartridges, a supply hole formed through the mid-case so that wet gas is supplied into the mid-case, and a discharge hole formed through the mid-case so that the wet gas is discharged the mid-case. The wet part comprises a wet body for accommodating the humidifying modules therein, a supply member for supplying the wet gas to the wet body, and a discharge member for discharging the wet gas from the wet body.

In the fuel cell humidifying system according to an embodiment of the present disclosure, the humidifying modules are arranged to be stacked in the wet body in a vertical direction; the supply member and the discharge member are coupled to a wet upper surface of the wet body, and the supply cap and the discharge cap are spaced apart from each other in a first axial direction spaced apart from each other, wherein the supply holes are formed through a mid upper surface of the mid-case; the discharge holes are formed through the mid upper surface and are spaced apart from the supply holes in the first axial direction; and among the humidifying modules, an uppermost humidifying module includes a first transfer hole formed through a mid lower surface of the mid-case so that a part of the wet gas supplied through the supply hole is supplied to a humidifying module disposed at a lower side, and a second transfer hole formed through the mid lower surface so that the wet gas discharged from the humidifying module disposed at the lower side is introduced.

In the fuel cell humidifying system according to an embodiment of the present disclosure, in the uppermost humidifying module disposed, the supply hole and the discharge hole are spaced apart from each other in opposite directions from a midpoint equidistant from both ends of the mid-case with reference to the first axial direction, and the first transfer hole and the second transfer hole are spaced apart from each other in opposite directions from the midpoint; a supply hole of the humidifying module disposed at the lower side of the uppermost humidifying module is disposed to oppose a first transfer hole of the uppermost humidifying module; and a discharge hole of the humidifying module disposed at the lower side of the uppermost humidifying module is disposed to oppose a second transfer hole of the uppermost humidifying module.

In the fuel cell humidifying system according to an embodiment of the present disclosure, each of the humidifying modules includes a blocking member protruding outward from the mid-case between the supply hole and the discharge hole in the first axial direction, and the blocking members are formed extending along a circumference of the mid-case so as to surround the mid-case.

In the fuel cell humidifying system according to an embodiment of the present disclosure, a sliding assembly capable of sliding according to a pressure of the wet gas may be included.

In the fuel cell humidifying system according to an embodiment of the present disclosure, the sliding assembly may include: a first sliding member formed in the wet upper surface, protruding toward the mid upper surface, and spaced apart from the mid upper surface; and a second sliding member formed in the mid upper surface, protruding toward the wet upper surface, and spaced apart from the wet upper surface.

In the fuel cell humidifying system according to an embodiment of the present disclosure, each of the first sliding member and the second sliding member may have sliding protrusions protruding opposite to each other in the first axial direction, and a sliding space may be formed between the two sliding protrusions.

In the fuel cell humidifying system according to an embodiment of the present disclosure, the sliding assembly may include: a first slant sliding member formed in the wet upper surface, protruding obliquely toward the mid upper surface, and spaced apart from the mid upper surface; and a second slant sliding member formed in the mid upper surface, protruding obliquely toward the wet upper surface, and spaced apart from the wet upper surface.

In the fuel cell humidifying system according to an embodiment of the present disclosure, the first slant sliding member and the second slant sliding member may be formed to have corresponding inclination angles so that the first slant sliding member moves up and down while the first slant sliding member and the second slant sliding member are in contact with each other.

Advantageous Effects

In the present disclosure, a supply member and a discharge member of a wet part may be commonly used in supplying and discharging wet gas to and from humidifying modules. In addition, in the present disclosure, a supply cap and a discharge cap may be commonly used in supplying and discharging battery gas to the humidifying modules. Accordingly, in the present disclosure, although a plurality of humidifying modules is provided to increase a flow rate of humidified air, it is possible to reduce an installation area in a work space where the humidifying process is performed. Therefore, in the present disclosure, it is possible to reduce construction and operating costs, while contributing to increasing an amount of power generation of a fuel cell system by increasing the flow rate of humidified air.

MODE FOR DISCLOSURE

The present disclosure may include various modifications and embodiments, and therefore, the present disclosure will be explained in detail by taking exemplary embodiments. However, this is not intended to limit the present disclosure to the particular exemplary embodiments, and it should be noted that the present disclosure is intended to include all variations, equivalents, and substitutions that are included in the technical scope of the idea of the present disclosure.

The terms and expressions used in the present disclosure are used only for the purpose of illustrating particular embodiments, and are not intended to limit the present disclosure. Unless stated otherwise, an expression of singularity is intended to include expressions of plurality. It should be noted that the terms "include" or "have" as used in the present disclosure are intended to denote the existence of any features, numerical values, steps, operations, constituent elements, parts, and combinations thereof described in the specification, but are not intended to preliminarily exclude the possibility of existence or addition of any one or more other features, numerical values, steps, operations, constituent elements, parts, and combinations thereof. Hereinafter, a fuel cell membrane humidifying system according to an embodiment of the present disclosure will be described with reference to the drawings.

Figure 2:
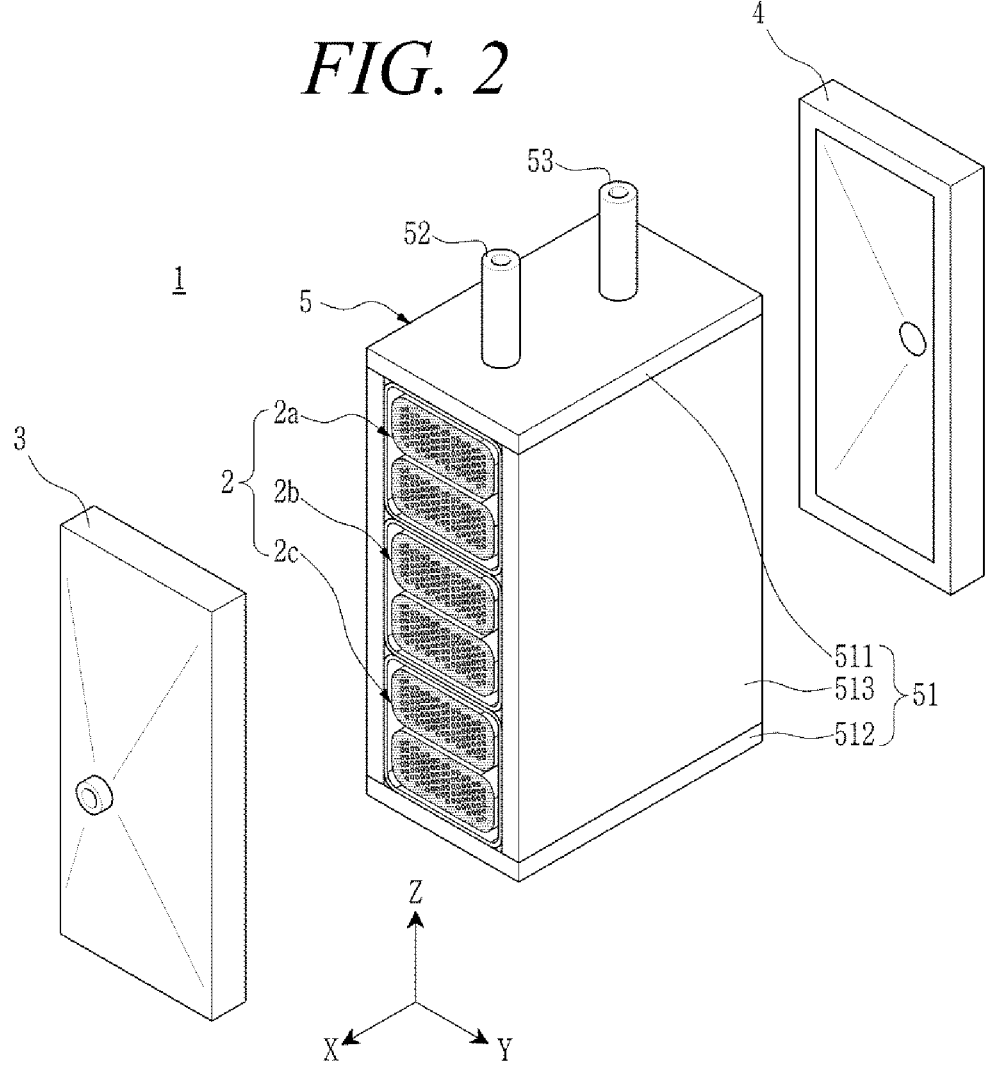
FIG. 2 is a schematic exploded perspective view of a fuel cell humidifying system according to the present disclosure.
Figures 3, 4:
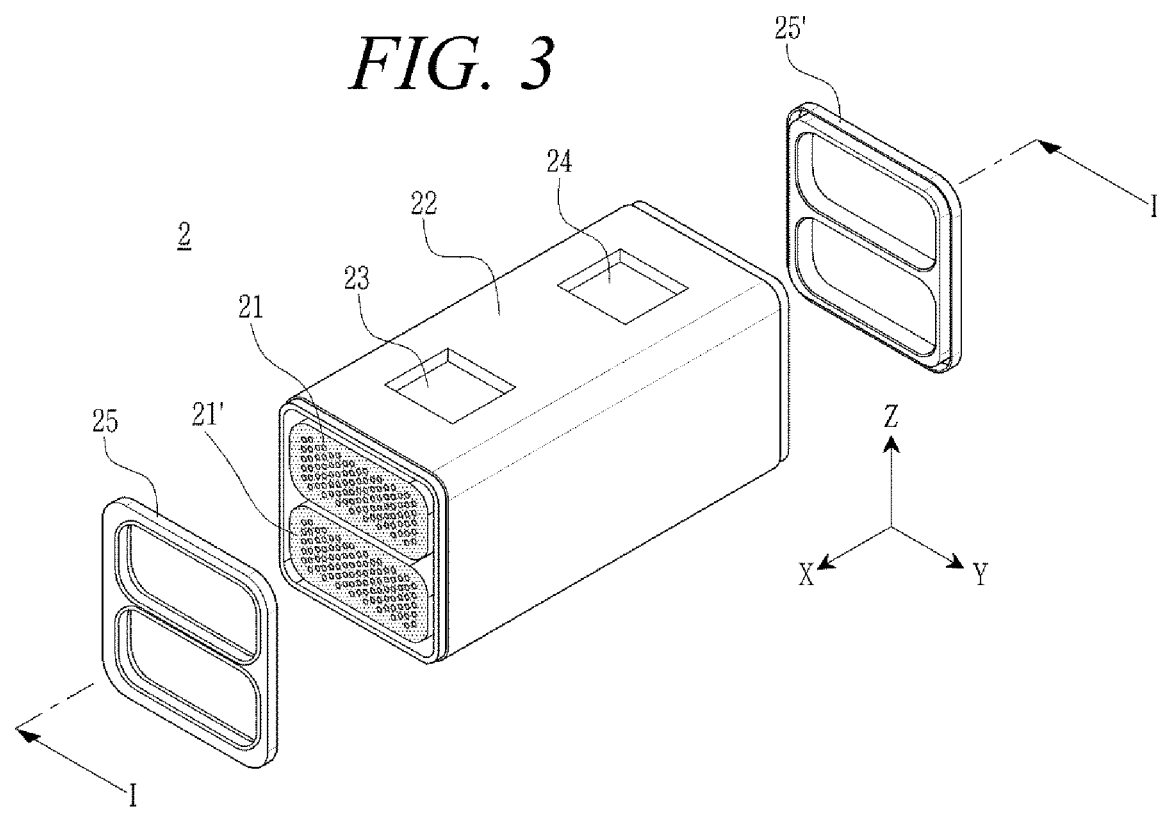
FIG. 3 is a schematic exploded perspective view of one humidifying module in a fuel cell humidifying system according to the present disclosure.
FIG. 4 is a schematic cross-sectional view taken along a line I-I of FIG. 3.

Referring to FIGS. 2 and 3, a fuel cell humidifying system 1 according to the present disclosure is to humidify battery gas to be supplied to a fuel cell stack (not shown) by using wet gas. The battery gas is supplied to the fuel cell stack and used for power generation by the fuel cell. For example, the battery gas may be fuel gas or air. The wet gas contains moisture so that the battery gas can be humidified. For example, the wet gas may be off-gas discharged from the fuel cell stack.

The fuel cell humidifying system 1 according to the present disclosure includes: a plurality of humidifying modules 2 for humidifying the battery gas using the wet gas; a supply cap 3 for supplying the battery gas to the humidifying modules 2; a discharge cap 4 for discharging the battery gas discharged from the humidifying modules 2 to the fuel cell stack; and a wet part for supplying the wet gas to the humidifying modules 2 and discharging the wet gas discharged from the humidifying modules 2.

The wet part 5 includes a wet body 51 for accommodating the humidifying modules 2 therein, a supply member 52 for supplying wet gas to the inside of the wet body 51, and a discharge member 53 for discharging the wat gas from the inside of the wet body 51. The wet gas supplied to the inside of the wet body 51 through the supply member 52 may be used by the humidifying modules 2 disposed in the wet body 51 to humidify the battery gas, and then discharged through the discharge member 53. The supply cap 3 is coupled to one side of the wet part 5. The supply cap 3 may supply the battery gas to the humidifying modules 2 disposed in the wet body 51. The discharge cap 4 is coupled to the other side of the wet part 5. The discharge cap 4 may discharge the battery gas discharged from the humidifying modules 2 disposed in the wet body 51 to the fuel cell stack.

As described above, the fuel cell humidifying system 1 according to the present disclosure is implemented such that the supply member 52 and the discharge member 53 of the wet part 5 are commonly used in supplying and discharging the wet gas to the humidifying modules 2. In addition, the fuel cell humidifying system 1 according to the present disclosure is implemented such that the supply cap 3 and the discharge cap 4 are commonly used in supplying and discharging the battery gas to and from the humidifying modules 2.

Figure 1:
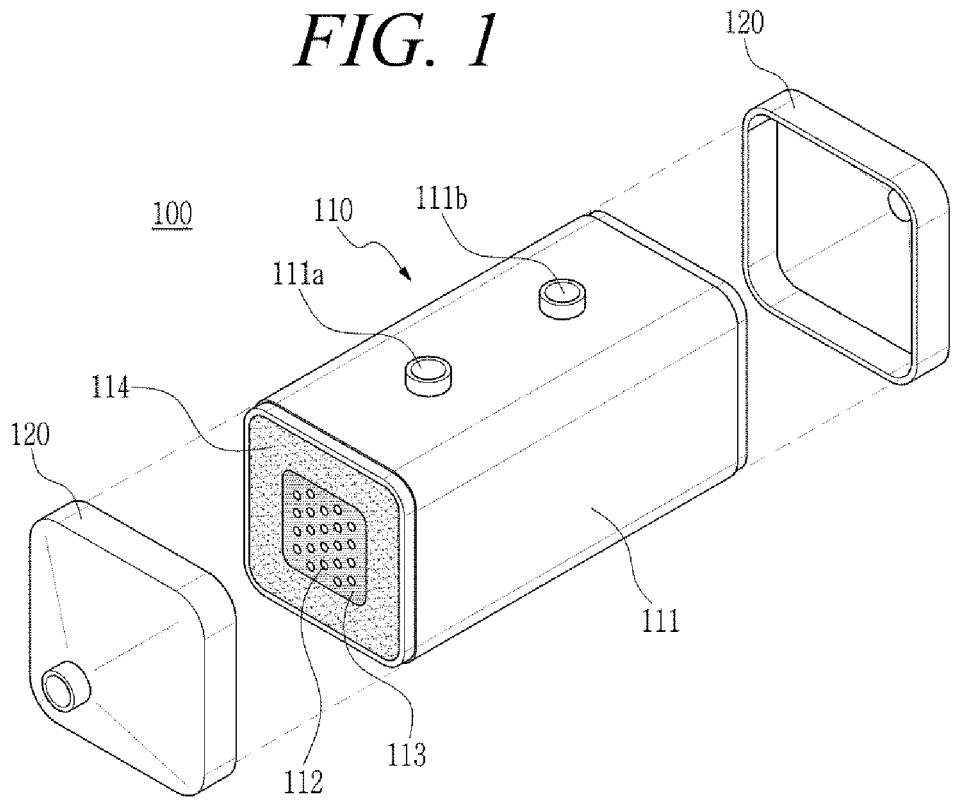
FIG. 1 is a schematic exploded perspective view of a conventional fuel cell humidifier.

Accordingly, the off-gas inlet 111a protruding from the mid-case 111 of the humidifier 100 as shown in FIG. 1 and the off-gas outlet 111b protruding from the mid-case 111 may be omitted. Therefore, in the fuel cell humidifying system 1 according to the present disclosure, although a plurality of humidifying modules 2 is provided to increase a flow rate of humidified air, an installation area in a work space where the humidification process is performed may be reduced.

Accordingly, in the fuel cell humidifying system 1 according to the present disclosure, it is possible to reduce construction and operating costs, while contributing to increasing the power generation of the fuel cell system by increasing the flow rate of humidified air.

Hereinafter, the humidifying modules 2, the wet part 5, the supply cap 3, and the discharge cap 4 will be described in detail with reference to the accompanying drawings.

Referring to FIGS. 2 to 4, each of the humidifying modules 2 humidifies battery gas by using wet gas. The humidifying modules 2 may be disposed inside the wet part 5. Referring to FIGS. 3 and 4, a specific example of any one humidifying module 2 among the humidifying modules 2 will be described as follows.

The humidifying module 2 includes a cartridge 21, a mid-case 22, a supply hole 23, and a discharge hole 24.

The cartridge 21 includes a plurality of hollow fiber membranes 211. The hollow fiber membranes 211 may be implemented as cartridges 21 and thus modularized. Accordingly, through a process of coupling the cartridges 21 to the mid-case 22, the hollow fiber membranes 211 may be installed in the mid-case 22. Therefore, the fuel cell humidifying system 1 according to the present disclosure may improve the ease of installation, separation, and replacement of the hollow fiber membranes 211.

The cartridge 21 may include an inner case 210 for accommodating the hollow fiber membranes 211 therein. The hollow fiber membranes 211 may be disposed inside the inner case 210 and thus modularized. The inner case 210 may have a first mesh hole MH1 through which off-gas flows in, and a second mesh hole MH2 through which off-gas is discharged. The hollow fiber membranes 211 may include a polymer film that is formed of polysulfone resin, polyethersulfone resin, sulfonated polysulfone resin, polyvinylidene fluoride (PVDF) resin, polyacrylonitrile (PAN) resin, polyimide resin, polyamideimide resin, polyesterimide resin, or a mixture of two or more thereof.

The cartridge 21 may include a first potting part 212. The first potting part 212 fixes one side of hollows fiber membranes 211. In this case, the first potting part 212 may be formed so as not to block the hollows of the hollow fiber membranes 211. The first potting part 212 may be formed by curing a liquid resin such as liquid polyurethane resin through a casting process. The first potting part 212 may fix one side of the inner case 210 and the hollow fiber membranes 211.

The cartridge 21 may include a second potting part 213. The second potting part 213 fixes the other side of the hollow fiber membranes 211. In this case, the first potting part 212 may be formed so as not to block the hollows of the hollow fiber membranes 211. Accordingly, the battery gas to be supplied to the fuel cell stack is supplied to the hollows of the hollow fiber membranes 211 without interference by the second potting part 213 and the first potting part 212, and is then supplied to the fuel cell stack after humidification. The second potting part 213 may be formed by curing a liquid resin such as liquid polyurethane resin through a casting process. The second potting part 213 may fix the other side of the inner case 210 and the hollow fiber membranes 211.

The mid-case 22 has the cartridge 21 coupled thereto. A plurality of cartridges 21 may be coupled to the inside of the mid-case 22. FIGS. 3 and 4 show that two cartridges 21 and 21' are coupled to the inside of the mid-case 22, but aspects of the present disclosure are not limited thereto, and three or more cartridges 21 may be coupled in the mid-case 22. The internal space of the mid-case 22 and the internal spaces of the cartridges 21 may be communicatively connected to each other so that wet gas can flow therebetween. To this end, a plurality of through holes may be formed in the cartridges 21, respectively.

The supply hole 23 is formed through the mid-case 22. Wet gas may be supplied into the mid-case 22 through the supply hole 23. Through the supply hole 23, the inside of the mid-case 22 and the inside of the wet body 51 may be communicatively connected to each other supply hole so that the wet gas can flow therebetween.

The discharge hole 24 is formed through the mid-case 22. The wet gas may be discharged from the inside of the mid-case 22 through the discharge hole 24. Through the discharge hole 24, the inside of the mid-case 22 and the inside of the wet body 51 may be communicatively connected to each other so that the wet gas can flow therebetween.

The humidifying module 2 may include a plurality of packing members 25 and 25'. The packing members 25 and 25' seal between the mid-case 22 and the cartridges 21. Accordingly, the packing members 25 and 25' may prevent direct mixing of the battery gas and the wet gas. Among the packing members 25 and 25', one packing member 25 may seal between the mid-case 22 and the first potting parts 212, and the other packing member 25' may seal the mid-case 22 and the second poking portion 213. Although not shown, resin layers may be formed on both sides of the mid-case 22, instead of the packing members 25 and 25'.

The resin layers may be formed by curing a liquid polymer such as liquid polyurethane resin through a casting method.

Referring to FIGS. 2 to 4, the supply cap 3 supplies battery gas to the humidifying modules 2. The supply cap 3 may be coupled to one side of the wet part 5. The inside of the supply cap 3 and the hollow fiber membranes 211 of the humidifying modules 2 may be communicatively connected to each other so that battery gas can flow therebetween. The supply cap 3 may be coupled to the wet body 51 so as to cover one side of the wet body 51.

A sealing member such as an O-ring may be disposed between the supply cap 3 and the wet body 51.

Referring to FIGS. 2 to 4, the discharge cap 4 discharges the battery gas discharged from the humidifying modules 2 to the fuel cell stack. The discharge cap 4 may be coupled to the other side of the wet part 5. The inside of the discharge cap 4 and the hollow fiber membranes 211 of the humidifying modules 2 may be communicatively connected to each other so that battery gas can flow therebetween. The discharge cap 4 may be coupled to the wet body 51 so as to cover the other side of the wet body 51. A sealing member such as an O-ring may be disposed between the discharge cap 4 and the wet body 51. The discharge cap 4 and the supply cap 3 may be spaced apart from each other along a first axial direction (X-axis direction).

Referring to FIGS. 2 to 4, the wet part 5 supplies the wet gas to the humidifying modules 2 and discharges the wet gas discharged from the humidifying modules 2. The wet part 5 includes a wet body 51, a supply member 52, and a discharge member 53.

The wet body 51 accommodates the humidifying modules 2 therein. The wet body 51 may be formed such that both sides thereof are penetrated based on the first axial direction (X-axis direction). The wet body 51 may be formed in a rectangular parallelepiped shape with an empty interior throughout.

The supply member 52 supplies wet gas to the inside of the wet body 51. The inside of the supply member 52 and the wet body 51 may be communicatively connected to each other so that the wet gas can flow therebetween. The mid-cases 22 may be communicatively connected to each other so that the battery gas flowing along the hollow fiber membranes 211 is humidified using the wet gas supplied to the inside of the wet body 51 through the supply member 52. In this case, when the wet gas contacts the outer surfaces of the hollow fiber membranes 211, moisture contained in the wet gas permeates the hollow fiber membranes 211, thereby humidifying the battery gas flowing along the hollows of the hollow fiber membranes 211.

The discharge member 53 discharges the wet gas from the inside of the wet body 51. The inside of the discharge member 53 and the wet body 51 may be communicatively connected to each other so that wet gas can flow therebetween. The wet gas discharged from the inside of the wet body 51 may be a gas remaining after humidifying battery gas flowing along the hollow fiber membranes 211 of the humidifying modules 2. The mid-cases 22 may be communicatively connected to each other so that the wet gas after humidifying the battery gas is discharged through the discharge member 53.

Figure 5:
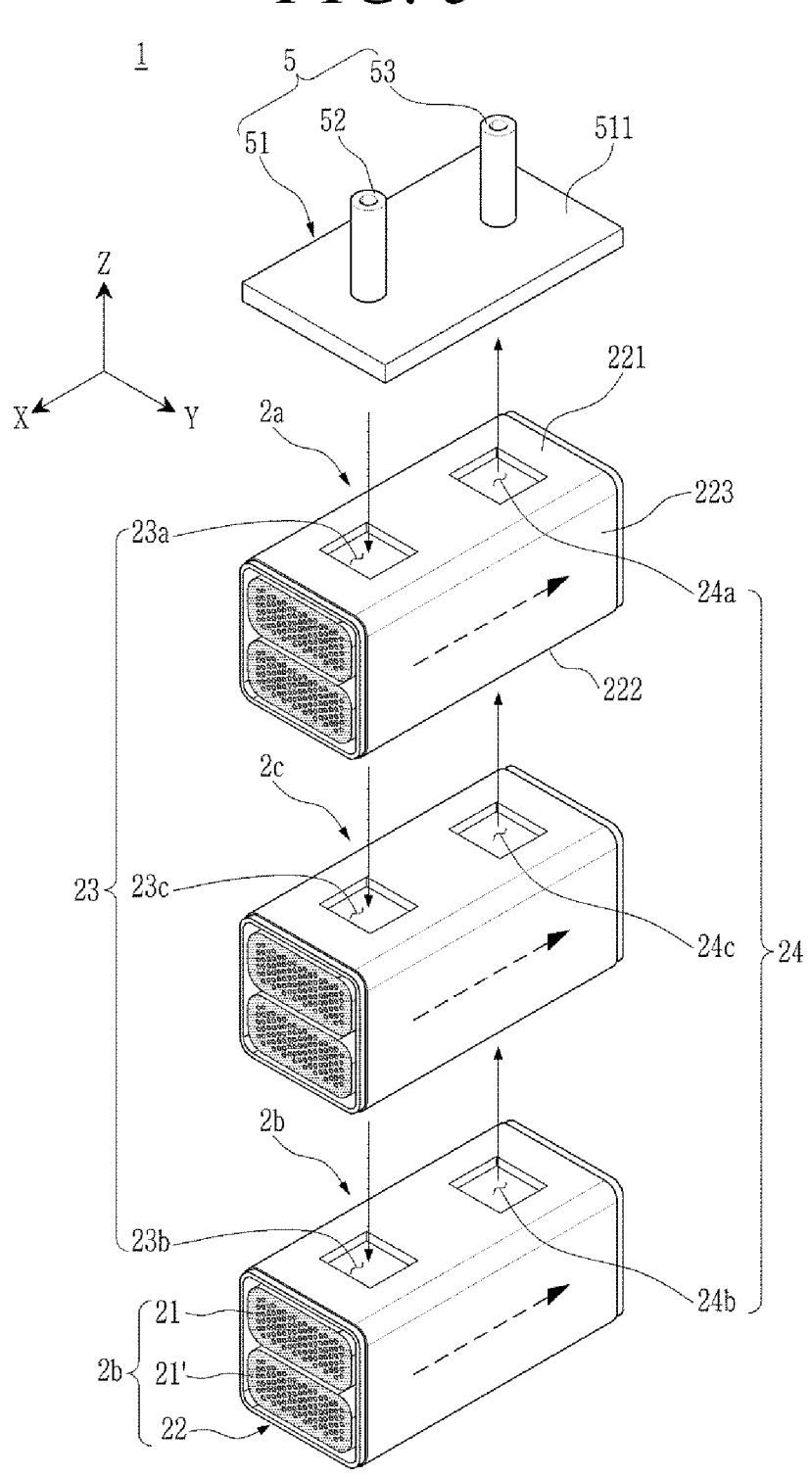
FIG. 5 is a conceptual perspective view illustrating a passage through which wet gas flows in a fuel cell humidifying system according to an embodiment of the present disclosure.
Figure 6:
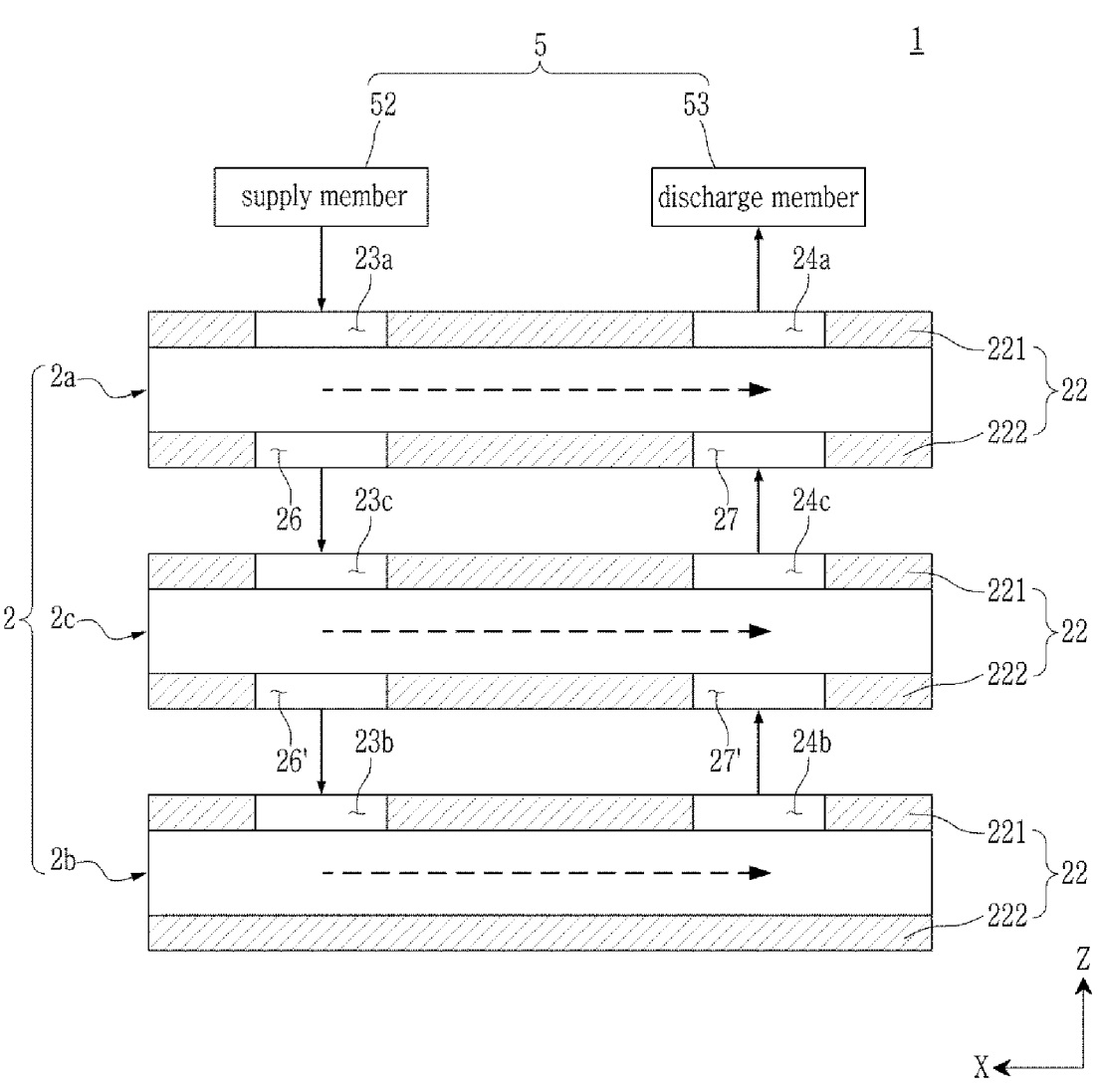
FIGS. 6 and 7 are conceptual views illustrating a passage through which wet gas flows through a wet part in a fuel cell humidifying system according to an embodiment of the present disclosure with reference to a cross-sectional view of the humidifiers taken along the line I-I of FIG. 3.
Figure 7:
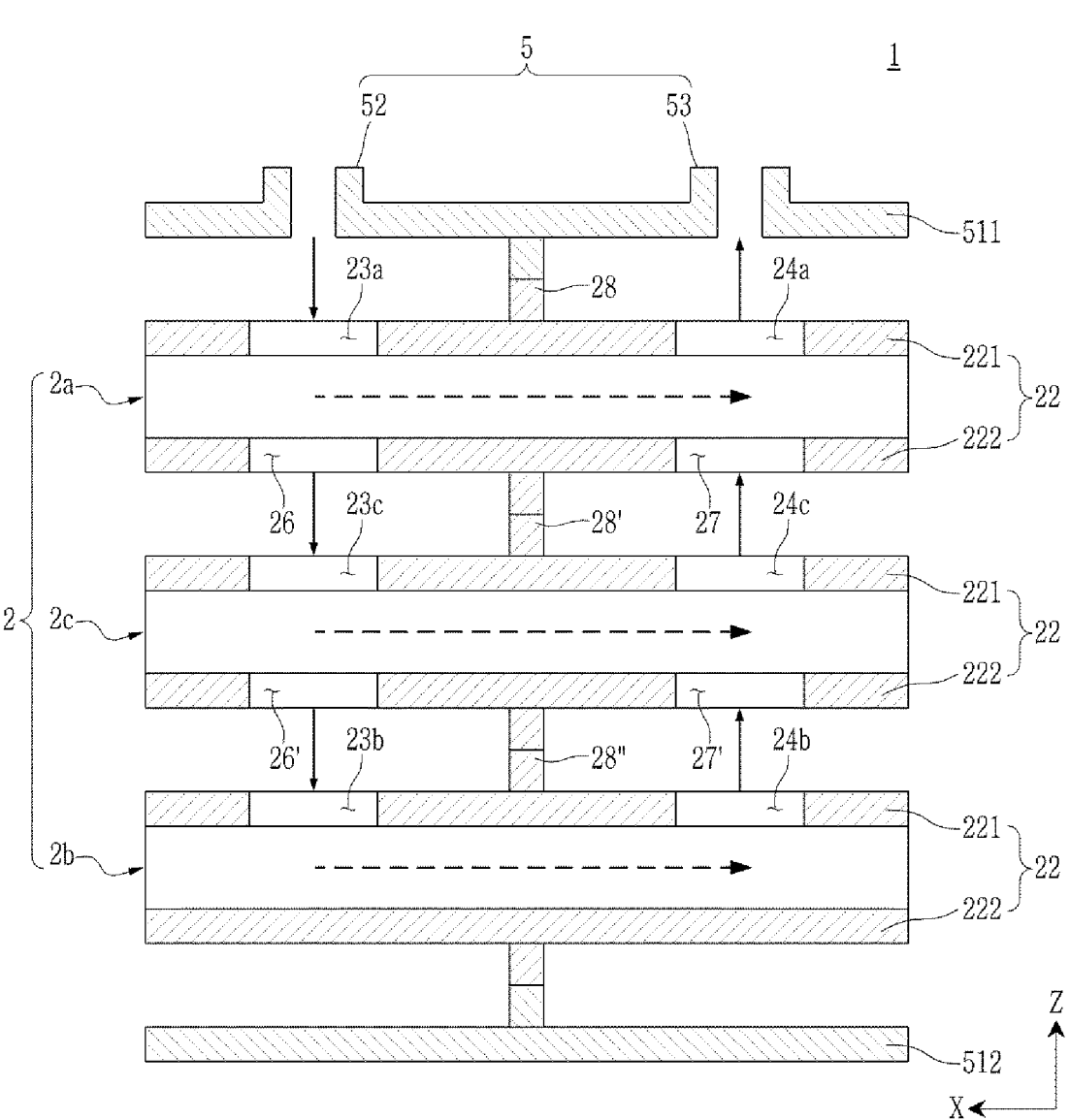

Referring to FIGS. 5 to 7, in the fuel cell humidifying system 1 according to an embodiment, the humidifying modules 2 may be stacked in the wet body 51 along a vertical direction (Z-axis direction). FIGS. 5 to 7 show that three humidifying modules 2 are stacked in the vertical direction (Z-axis direction) in the wet body 51, but aspects of the present disclosure are not limited thereto, and two humidifying modules 2 or four or more humidifying modules 2 may be disposed in the wet body 51.

The supply member 52 may be coupled to a wet upper surface 511. The discharge member 53 may be coupled to the wet upper surface 511. The discharge member 53 and the supply member 52 may be spaced apart from each other along the first axial direction (X-axis direction). The discharge member 53 and the supply member 52 may be arranged in opposite directions from a midpoint equidistant from both ends of the wet upper surface 511 with reference to the first axial direction (X-axis direction).

Each of the humidifying modules 2 may be formed with the supply hole 23 penetrating an mid upper surface 221 and the discharge hole 24 penetrating the mid upper surface 221. The supply hole 23 and the discharge hole 24 of each of the humidifying modules 2 may be spaced apart from each other with respect to the first axial direction (X-axis direction). Accordingly, the wet gas supplied to the inside of the mid-case 22 through the supply hole 23 may flow along the first axis direction (X-axis direction) and be then discharged through the discharge hole 24.

The supply hole 23 and the discharge hole 24 of each of the humidifying modules 2 may be arranged in opposite directions from a midpoint equidistant from both ends of the mid-case 22 with reference to the first axial direction (X-axis direction). With reference to the first axial direction (X-axis direction), a distance for the supply hole 23 to be spaced from one end of the mid-case 22 and a distance for the discharge hole 24 to be spaced from the other end of the mid-case 22 may be the same.

In a first humidifying module 2a, the supply hole 23a may be disposed toward the supply member 52 and a discharge hole 24a may be disposed toward the discharge member 53. The first humidifying module 2a may include a first transfer hole 26 formed through a mid lower surface 222, and a second transfer hole 27 formed through the mid lower surface 222. A part of the wet gas supplied to the inside of the first humidifying module 2a through the supply hole 23a may be supplied to a third humidifying module 2c through the first transfer hole 26, and the remaining part may flow toward the discharge hole 24a along the first axial direction (X-axis direction). The wet gas discharged from the third humidifying module 2c may flow into the first humidifying module 2a through the second transfer hole 27. With reference to the first axial direction (X-axis direction), the first transfer hole 26 and the second transfer hole 27 may be arranged in opposite directions from a midpoint equidistant from both ends of the mid-case 22.

In the third humidifying module 2c, a supply hole 23c may be disposed toward the first transfer hole 26 of the first humidifying module 2a, and a discharge hole 24c may be disposed toward a second transfer hole 27 of the first humidifying module 2a. The third humidifying module 2c may include a first transfer hole 26' formed through the lower surface 222, and a second transfer hole 27' formed through the lower surface 222. A part of the wet gas supplied into the third humidifying module 2c through the supply hole 23a may be supplied to a second humidifying module 2b through the first transfer hole 26', and the remaining part may flow toward a discharge hole 24b along one axis direction (X-axis direction). The wet gas discharged from the second humidifying module 2b may flow into the third humidifying module 2c through the second transfer hole 27'. With reference to the first axial direction (X-axis direction), the first transfer hole 26 'and the second transfer hole 27' may be arranged in opposite directions from a midpoint equidistant from both ends of the mid-case 22.

In the second humidifying module 2b, the supply hole 23b may be disposed toward the first transfer hole 26' of the third humidifying module 2c, and the discharge hole 24b may be disposed toward the second transfer hole 27' of the third humidifying module 2c.

In the fuel cell humidifying system 1 according to an embodiment of the present disclosure, the wet gas supplied to the wet body 51 through the supply member 52 may humidify the battery gas while flowing along the following passage until it is discharged to the outside of the wet body 51 through the discharge member 53.

First, the wet gas supplied to the inside of the wet body 51 through the supply member 52 is supplied to the inside of the first humidifying module 2a through the supply hole 23a. A part of the wet gas supplied to the inside of the first humidifying module 2a is discharged to the outside of the first humidifying module 2a through the first transfer hole 26, and the remaining part flows from one side to the other side of the mid-case 22 in the first axial direction (X axial direction). In this course, the first humidifying module 2a humidifies the battery gas by using the wet gas. The wet gas flowing to the other side of the mid-case 22 is discharged to the outside of the first humidifying module 2a through the discharge hole 24a and then to the outside of the wet body 51 through the discharge member 53. In this case, the wet gas introduced into the first humidifying module 2a through the second transfer hole 27 may be discharged to the outside of the first humidifying module 2a through the discharge hole 24a.

Next, the wet gas discharged to the outside of the first humidifying module 2a through the first transfer hole 26 is supplied to the inside of the third humidifying module 2c through the supply hole 23c. The supply hole 23c may be disposed to oppose the first transfer hole 26. A part of the wet gas supplied to the inside of the third humidifying module 2c is discharged to the outside of the third humidifying module 2c through the first transfer hole 26', and the remaining part moves from one side to the other side of the mid-case 22 in the first axial direction (X-axis direction). In this course, the third humidifying module 2c humidifies the battery gas by using the wet gas. The wet gas flowing to the other side of the mid-case 22 is discharged to the outside of the third humidifying module 2c through the discharge hole 24c, and then supplied to the inside of the first humidifying module 21 through the second transfer hole 27. The discharge hole 24c may be disposed to oppose the second transfer hole 27. In this case, the wet gas introduced into the third humidifying module 2c through the second transfer hole 27' may be discharged to the outside of the third humidifying module 2c through the discharge hole 24c.

Next, the wet gas discharged to the outside of the third humidifying module 2c through the first transfer hole 26' is supplied to the inside of the second humidifying module 2b through the supply hole 23b. The supply hole 23b may be disposed to oppose the first transfer hole 26'. The wet gas supplied to the inside of the second humidifying module 2b flows from one side to the other side of the mid-case 22 in the first axial direction (X-axis direction). In this course, the second humidifying module 2b humidifies the battery gas by using the wet gas. The wet gas flowing to the other side of the mid-case 22 is discharged to the outside of the second humidifying module 2b through the discharge hole 24b and then supplied to the third humidifying module 2c through the second transfer hole 27'. The discharge hole 24b may be disposed to oppose the second transfer hole 27'.

Here, each of the humidifying modules 2 may include a blocking member 28 protruding outward from the mid-case 22. Blocking members 28, 28', and 28" may be each formed extending along a circumference of the mid-case 22 so as to surround the mid-case 22. In this case, the blocking members 28, 28', and 28" may be disposed between the supply holes 23a, 23b, and 23c and the discharge holes 24a, 24b, and 24c with respect to the first axial direction (X-axis direction). In addition, the wet upper surface 511 and the wet lower surface 512 may include the blocking member 28 protruding toward the mid-case 22.

As the blocking member 28 of the first humidifying module 2a and the blocking member 28' of the third humidifying module 2c are disposed to be in contact with each other, it is possible to block passage of the wet gas. Therefore, the blocking member 28 of the first humidifying module 2a and the blocking member 28' of the third humidifying module 2c may reduce a flow rate of wet gas which is, after being discharged from the first transfer hole 26, not supplied to the supply hole 23c but flowing directly to the second delivery hole 27.

As the blocking member 28' of the third humidifying module 2c and the blocking member 28" of the second humidifying module 2b are disposed in contact with each other, it is possible to block passage of the wet gas. Accordingly, the blocking member 28' of the third humidifying module 2c and the blocking member 28" of the second humidifying module 2b may reduce a flow rate of wet gas which is, after being discharged from the first transfer hole 26, not supplied to the second transfer hole 27 but flowing directly to the second transfer hole 27".

Figure 8:
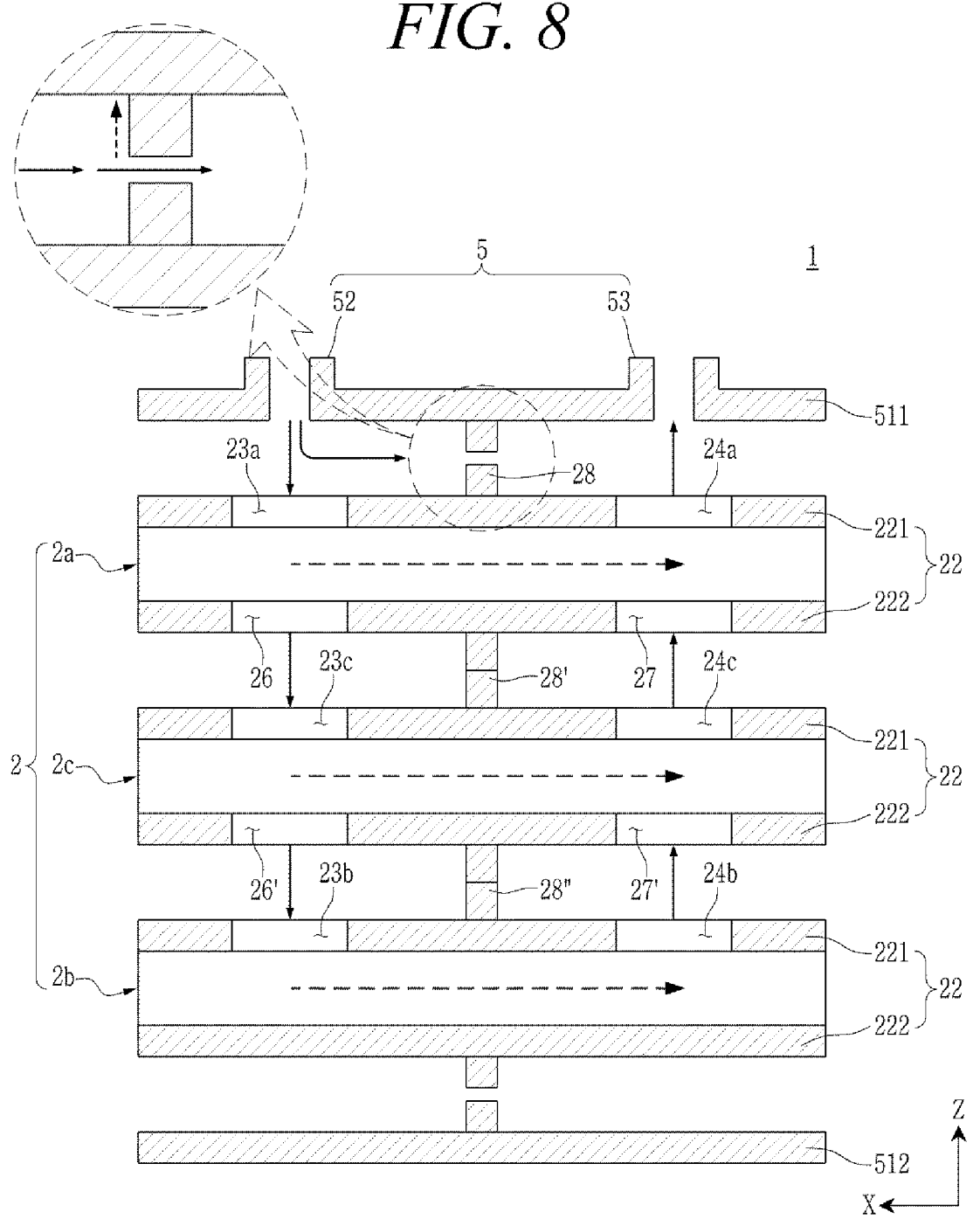
FIG. 8 is a conceptual diagram for explaining problems occurring in a wetted part of FIG. 7.

Meanwhile,]a humidifying process is performed while the wet gas flows at a considerable pressure. Thus, the wet upper surface 511 and the mid-case 22, and in some cases, the wet lower surface 512 and the mid-case 22 may expand outward according to the pressure of the wet gas. In this case, as shown in FIG. 8, the blocking member 28 in contact may be separated by the pressure of the wet gas. Accordingly, the flow rate of the wet gas bypassed without contacting the outer surfaces of the hollow fiber membranes 211 may increase.

Figure 9:
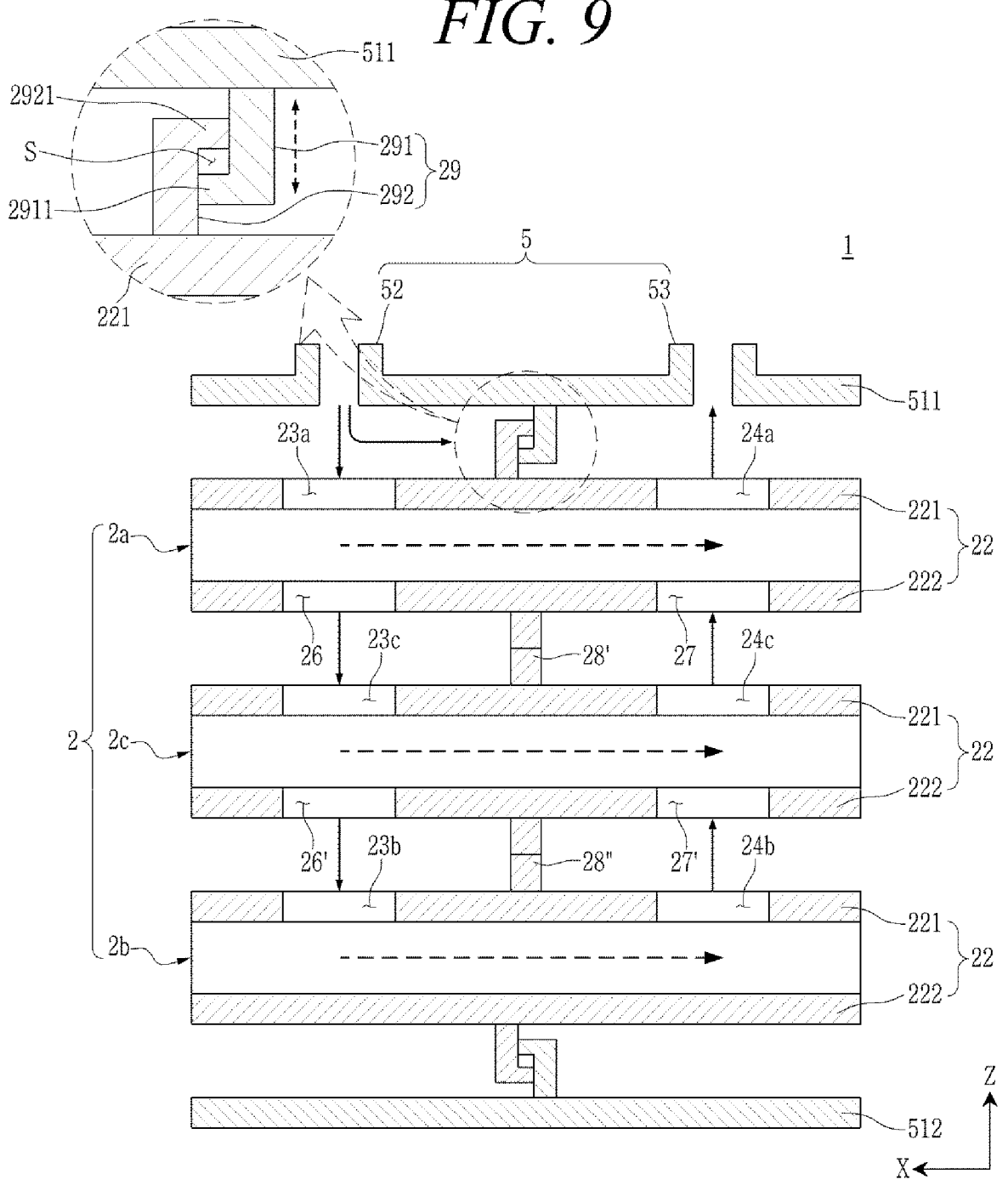
FIGS. 9 and 10 are cross-sectional views showing a wet part of a fuel cell humidifying system according to the present disclosure, which are schematic cross-sectional views showing a wet part including a sliding assembly.
Figure 10:
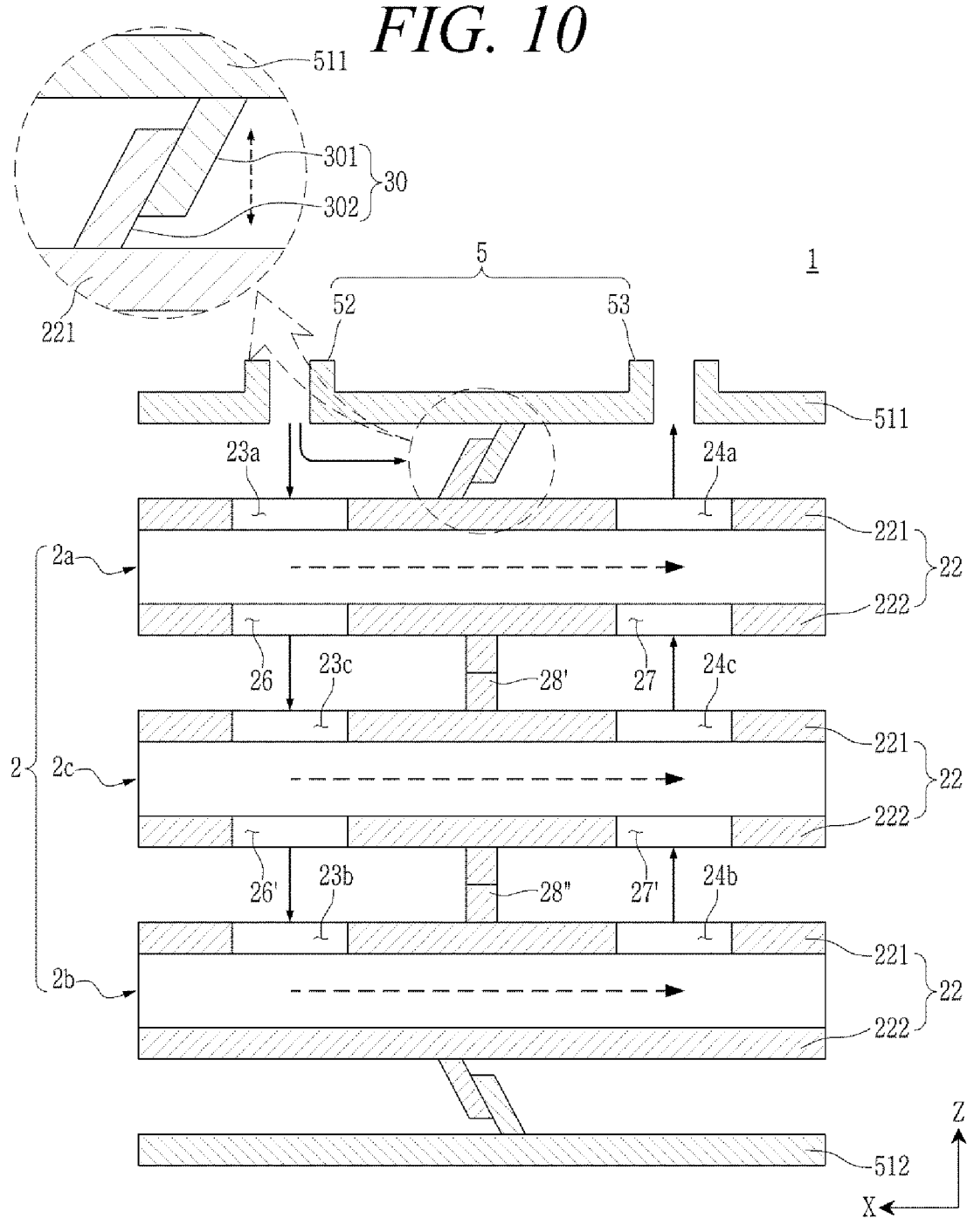

Accordingly, as shown in FIGS. 9 and 10, the present disclosure may further include a sliding assembly 29 and 30 capable of sliding according to the pressure of the wet gas, instead of the blocking member 28.

Referring to FIG. 9, the sliding assembly 29 includes a first sliding member 291 and a second sliding member 292. The first sliding member 291 is formed in the wet upper surface 511, protrudes toward the mid upper surface 221, and is spaced apart from the mid upper surface 221. The second sliding member 292 is formed in the mid upper surface 221, protrudes toward the wet upper surface 511, and is spaced apart from the wet upper surface 511.

The first sliding member 291 and the second sliding member 292 are respectively provided with sliding protrusions 2911 and 2921 protruding opposite each other in a horizontal direction (X-axis direction, first axial direction), and a sliding space S is formed between the two sliding protrusions 2911 and 2921.

When the pressure of the wet gas is relatively low, a first sliding member 291 moves downward so that the sliding space S between the sliding protrusion 2911 of the first sliding member 291 and the sliding protrusion 2921 of the second sliding member 292 is increased.

When the pressure of the wet gas is relatively high, the first sliding member 291 moves upward so that the sliding space S between the sliding protrusion 2911 of the first sliding member 291 and the sliding protrusion 2921 of the second sliding member 292 is reduced. When the pressure of the wet gas further increases, the two sliding protrusions 2911 and 2921 may come into contact with each other, so the sliding space S is temporarily absent.

Referring to FIG. 10, a sliding assembly 30 includes a first slant sliding member 301 and a second slant sliding member 302. The first slant sliding member 301 is formed in the wet upper surface 511, protrudes obliquely toward the mid upper surface 221, and is spaced apart from the mid upper surface 221. The second slant sliding member 302 is formed in the mid upper surface 221, protrudes obliquely toward the wet upper surface 511, and is spaced apart from the wet upper surface 511.

The first slant sliding member 301 and the second slant sliding member 302 are formed to have inclination angles corresponding to each other, so that the first slant sliding member 301 can move up and down while the first slant sliding member and the second slant sliding member are in contact with each other.

When the pressure of the wet gas is relatively low, the first slant sliding member 301 may move downward so that a distance between the wet upper surface 511 and the mid upper surface 221 is reduced.

When the pressure of the wet gas is relatively high, the first slant sliding member 301 may move upward so that the distance between the wet upper surface 511 and the mid upper surface 221 is increased.

If the pressure of the wet gas is further increased, the first slant sliding member 301 and the second slant sliding member 302 may come out of contact, however, if an actual pressure range of the wet gas while in operation is obtained and the slope angles of the first slope sliding member 301 and the second slope sliding member 302 are appropriately set based on the pressure range, it is possible for the first slope sliding member 301 and the second slope sliding member 302 to remain in a contact state.

As described above, if the sliding assemblies 29 and 30 that can slide according to the pressure of the wet gas are installed instead of the blocking member 28, even if the wetting upper surface 511 expands outward according to the pressure of the wet gas, wetting It is possible to prevent gas from being directly discharged to the discharge member 53 by bypassing the hollow fiber membrane, thereby improving humidification efficiency.

While the present disclosure has been particularly shown and described with reference to exemplary embodiments thereof, it will be understood by those of ordinary skill in the art that various modifications and changes may be made therein through inclusion, alteration, removal or addition of elements without departing from the spirit and scope of the present disclosure as defined by the following claims.

| [Detailed Description of Main Elements] | |
| --- | --- |
| 1: fuel cell humidifying system | 2: humidifying module |
| 3: supply cap | 4: discharge cap |
| 5: wet part | 21: cartridge |
| 22: mid-case | 23: supply hole |
| 24: discharge hole | 26: first transfer hole |
| 27: second transfer hole | 28: blocking member |
| 29, 30: sliding assembly | 51: wet body |
| 52: supply member | 53: discharge member |

The invention claimed is:

1. A fuel cell humidifying system comprising:
a plurality of humidifying modules configured to humidify battery gas to be supplied to a fuel cell stack by using wet gas;
a humidifier configured to supply the wet gas to the humidifying modules and discharge the wet gas discharged from the humidifying modules;
a supply cap coupled to one side of the humidifier to supply the battery gas to the humidifying modules; and a discharge cap coupled to the other side of the humidifier to discharge the battery gas discharged from the humidifying modules to the fuel cell stack, wherein each of the humidifying modules comprises one or more cartridges coupled to a plurality of hollow fiber membranes, a mid-case coupled to one or more of the cartridges, a supply hole formed through the mid-case so that the wet gas is supplied into the mid-case, and a discharge hole formed through the mid-case so that the wet gas is discharged from the mid-case, and wherein the wet part comprises a wet body for accommodating the humidifying modules therein, a supply member for supplying the wet gas to the wet body, and a discharge member for discharging the wet gas from the wet body, wherein the humidifying modules are arranged to be stacked in the wet body in a vertical direction, wherein the supply cap and the discharge cap are spaced apart from each other in a first axial direction, wherein the supply member and the discharge member are coupled to a wet upper surface of the wet body, and the supply member and the discharge member are spaced apart from each other in the first axial direction, wherein the supply holes are formed through a mid upper surface of each of the mid-case, wherein the discharge holes are formed through the mid upper surface and are spaced apart from the supply holes in the first axial direction, and wherein among the humidifying modules, an uppermost humidifying module comprises:

a first transfer hole formed through a mid lower surface of the mid-case so that a part of the wet gas supplied through the supply hole is supplied to a humidifying module disposed at a lower side; and a second transfer hole formed through the mid lower surface so that the wet gas discharged from the humidifying module disposed at the lower side is introduced, wherein in the uppermost humidifying module disposed, the supply hole and the discharge hole are spaced apart from each other in opposite directions from a midpoint equidistant from both ends of the mid-case with reference to the first axial direction, and the first transfer hole and the second transfer hole are spaced apart from each other in opposite directions from the midpoint, wherein a supply hole of the humidifying module disposed at the lower side of the uppermost humidifying module is disposed to oppose a first transfer hole of the uppermost humidifying module, and wherein a discharge hole of the humidifying module disposed at the lower side of the uppermost humidifying module is disposed to oppose a second transfer hole of the uppermost humidifying module, wherein each of the humidifying modules comprises a blocking member protruding outward from the mid-case between the supply hole and the discharge hole in the first axial direction, and wherein the blocking members are formed extending along a circumference of the mid-case so as to surround the mid-case.

2. The fuel cell humidifying system of claim 1, comprising: a sliding assembly capable of sliding according to a pressure of the wet gas.

3. The fuel cell humidifying system according to claim 2, wherein the sliding assembly comprises:

a first sliding member formed in the wet upper surface, protruding toward the mid upper surface, and spaced apart from the mid upper surface; and a second sliding member formed in the mid upper surface, protruding toward the wet upper surface, and spaced apart from the wet upper surface.

4. The fuel cell humidifying system of claim 3, wherein each of the first sliding member and the second sliding member has sliding protrusions protruding opposite to each other in the first axial direction, and a sliding space is formed between the two sliding protrusions.

5. The fuel cell humidifying system according to claim 2, wherein the sliding assembly comprises: a first slant sliding member formed in the wet upper surface, protruding obliquely toward the mid upper surface, and spaced apart from the mid upper surface; and a second slant sliding member formed in the mid upper surface, protruding obliquely toward the wet upper surface, and spaced apart from the wet upper surface.

6. The fuel cell humidifying system of claim 5, wherein the first slant sliding member and the second slant sliding member are formed to have corresponding inclination angles, and the first slant sliding member moves up and down while the first slant sliding member and the second slant sliding member are in contact with each other.

* * * * *